(12) United States Patent
Campbell

(10) Patent No.: US 6,223,651 B1
(45) Date of Patent: May 1, 2001

(54) APPARATUS FOR SEASONING FOOD

(76) Inventor: Curtis Jay Campbell, 3087 No. 1225 E., No. Ogden, UT (US) 84414

( * ) Notice: Subject to any disclaimer, the term of this patent is extended or adjusted under 35 U.S.C. 154(b) by 0 days.

(21) Appl. No.: 09/494,469

(22) Filed: Jan. 31, 2000

(51) Int. Cl.[7] .................................................. A22C 9/00
(52) U.S. Cl. ............................................. 99/494; 452/146
(58) Field of Search ...................... 99/483, 494; 452/146, 452/144, 141, 145; 264/261, 273; 30/305

(56) References Cited

U.S. PATENT DOCUMENTS

| | | | |
|---|---|---|---|
| D. 235,304 | * 6/1975 | Greenberg | D7/682 |
| 524,436 | * 8/1894 | Hake | 452/146 |
| 3,441,980 | * 5/1969 | Defenbaugh | 452/146 |
| 5,593,346 | * 1/1997 | Washington | 452/146 |

* cited by examiner

Primary Examiner—Reginald L. Alexander
(74) Attorney, Agent, or Firm—John E. Schone

(57) ABSTRACT

An apparatus for transporting seasoning within a food product and particularly within a meat, fish or poultry product is disclosed. The apparatus comprises a handle, a head and a plurality of prongs. Seasoning adheres to the prongs and is transported inside of the food product when the prongs are inserted into the food. In a second embodiment of the apparatus, the prongs are tiered to increase the adhesion of the seasoning to the prongs and thereby transport additional quantities of seasoning into the interior of the food product.

12 Claims, 1 Drawing Sheet

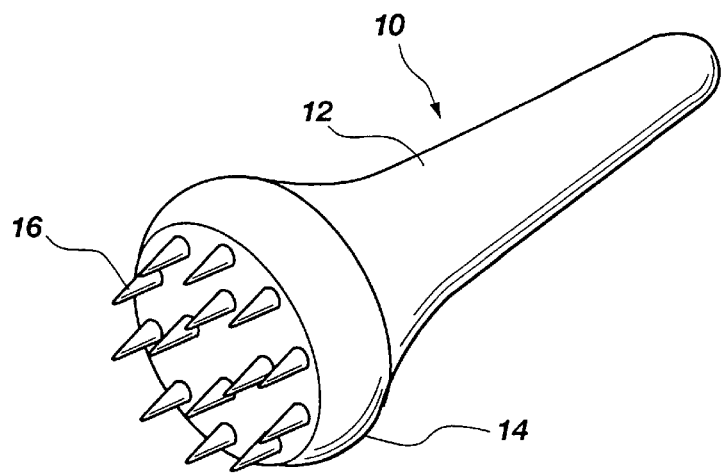
Fig. 1
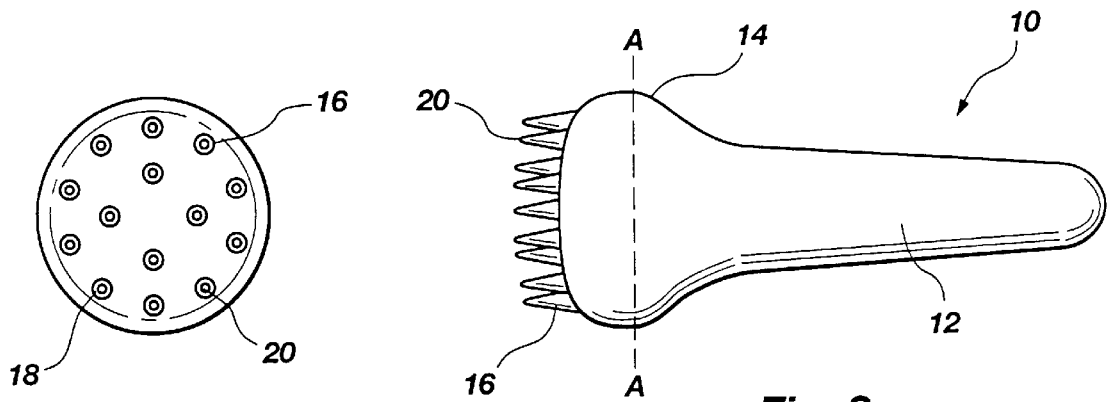
Fig. 3      Fig. 2
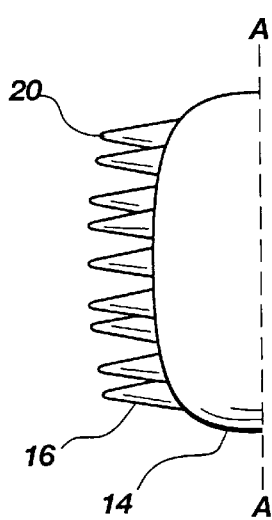   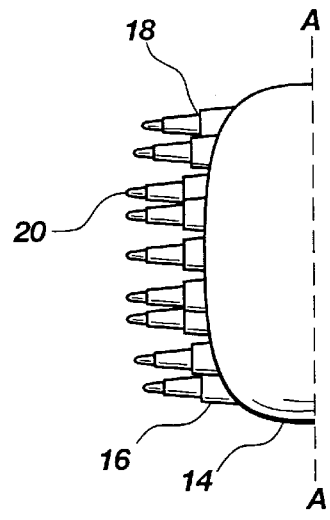
Fig. 4      Fig. 5

APPARATUS FOR SEASONING FOOD

BACKGROUND OF THE INVENTION

The present invention relates generally to the field of food preparation and more particularly to the seasoning of meats and other solid foods. The present invention is particularly useful for seasoning meats, including but not limited to, beef, poultry and fish.

The use of seasonings, herbs and other food additives, in conjunction with the preparation and cooking of solid foods is of ancient origin. Such seasonings and additives are typically sprinkled on the outer surfaces of the solid food to be prepared prior to cooking or during the actual cooking of the food. The intention is to improve the flavor of the food or to make it more palatable. It has been found that the best use of the seasonings and additives can be achieved if such ingredients can be injected inside of the food and not merely limited to distribution on the outer surfaces of the food. Common methods of injecting the seasonings within the food include the use of a knife or fork to penetrate the food with the intention and expectation that the seasonings will be drawn into the food thus becoming more widely distributed throughout the food.

Such simplistic methods as penetrating the food with a knife or fork has proven to be inadequate for seasoning purposes, and as a result many other methods for distributing seasonings and additives have been proposed. Many of the proposed devices however, are elaborate or cumbersome, and not well suited for household use by an individual housewife preparing a meal.

U.S. Pat. No. 3,916,777 for example teaches a meat tenderizing system however it is altogether too elaborate for average household use. The system dispenses an enzyme into the meat through an injection needle attached to a hose. U.S. Pat. No. 4,178,660 also teaches an apparatus for distributing additives in meat, but this device is also too complicated for the average housewife.

It injects additives into the body of the meat, which additives are housed in a cylinder, and are forced into the meat when it has been pierced. U.S. Pat. No. 4,414,885 is also of a similar nature. This system injects food additives inside the meat by forcing the additives out of a cylinder by means of a plunger that is attached to the device.

Other devices have been proposed for tenderizing meat that rely upon blades and knives to cut the sinew and tendon included in the meat and thereby increase the tenderness of the meat by such means. U.S. Pat. No. 4,908,909 for example teaches a meat hammer which is operated by a piston. U.S. Pat. No. 5,593,346 contemplates a meat tenderizing mallet that injects tenderizing fluids into the meat through apertures on the mallet head. U.S. Pat. No. 4,242,774 is also a meat tenderizer that has as its intent and purpose, the cutting of fiber in the meat utilizing the sharp teeth found on the meat tenderizing device. Finally U.S. Pat. No. 5,922,377 teaches an apparatus for flavoring food that utilizes a rod to penetrate the meat and deposit the food flavorings that are attached to the rod. The flavorings have been loosely held to the rod through the use of a binder agent. To distribute flavorings throughout the entire body of meat the rod must be inserted a number of times or, alternatively, several rods must be utilized.

Although each of these devices and others like them address the subject of food preparation and more particularly the preparation of meat, poultry and fish there still remains a need to provide a quick, easy and efficient method of distributing food seasonings throughout the solid food that can be utilized by the typical housewife in the household.

OBJECTS OF THE INVENTION

Accordingly it is a principle object of the invention to provide an apparatus for distributing seasonings, flavorings and sauces in solid foods, and in particular in meat, poultry and fish.

Another object is to distribute surface applied seasonings and sauces uniformly beneath the outer surface of the food. It is yet again another object to create surface penetrations of solid food products to allow for easier penetration by subsequently applied applications of sauces and seasonings. Another object is to minimize the loss of surface_applied seasonings during the cooking process. Yet another object is to minimize the attachment of food particles to the seasoning apparatus when the apparatus is removed from the food.

A still further object is to create a meat seasoning device that is easily used by the average person and average housewife. The present invention can be easily held in the hand of an average person and stored in the typical kitchen cabinet drawer. The present invention is also easily cleanable in an automatic dishwasher and is safe for use in such dishwashers.

These and other advantages of the present invention will become apparent from the subsequent detailed description of the preferred embodiment and the appended claims when read in conjunction with the accompanying drawings which are described below.

BRIEF DESCRIPTION OF THE DRAWINGS

FIG. 1 is a perspective view of a first embodiment of the apparatus for seasoning food.

FIG. 2 is a side view of the first embodiment of the apparatus for seasoning food.

FIG. 3 is an end view of the first embodiment showing in more detail the head of the apparatus for seasoning food, and the prongs mounted on the head.

FIG. 4 is a partial side view of FIG. 2 taken along the line A—A.

FIG. 5 is a partial side view of FIG. 2 taken along line A—A but representing a second embodiment of the present invention.

DETAILED DESCRIPTION OF THE INVENTION AND PREFERRED EMBODIMENT

FIG. 1 is a perspective view of the apparatus for seasoning food 10 encompassing one embodiment of the present invention. The apparatus for seasoning food 10 generally comprises handle 12, a head 14 and prongs 16 mounted on head 14. The apparatus for seasoning food 10 is of a size that is convenient for use by the average housewife. The apparatus for seasoning food is of a weight such that prongs 16 can be easily driven into the food by grasping handle 12 and tapping downwardly as much as necessary such that prongs 16 are driven into the food. Typically the food to be seasoned would be sprinkled with seasoning or flavoring on the outer surface and then by tapping the apparatus for seasoning food, the prongs 16 are driven into the food carrying the seasonings with them. The apparatus for seasoning food 10 can also be used to tap the food before adding the seasoning, thus making perforations in the food to allow seasonings or flavorings to easily penetrate the food. This works particularly well when the seasoning or flavorings to be added are in a liquid form such as during a marination process.

Handle 12 as can be seen in FIG. 1 is, in the preferred embodiment, of a size that can be conveniently held in the hand. No particular size is required according to the present invention, however, in a preferred embodiment of the present invention, handle 12 is elongated and is round and of a diameter such that the fingers of an average person can easily grasp said handle 12. According to the present invention handle 12 could be made from any convenient rigid, resilient material including wood, metal or plastic. In a preferred embodiment handle 12 would be manufactured from a polycarbonate plastic. In a preferred embodiment head 14 and prongs 16 would also be manufactured of the same polycarbonate material, but may be manufactured from any rigid, resilient material including wood, metal or plastic.

FIG. 2 is a side view of the apparatus for seasoning food 10 and depicts head 14 in more detail as it is mounted and attached to handle 12. No specific head 14 size or shape is required according to the present invention, however, in a preferred embodiment head 14 would be of a size large enough to easily and reasonably accommodate fourteen (14) prongs 16. Head 14 is mounted and attached to handle 12 by any traditional attachment methods and means including, bolts, screws, nails, threads, adhesives or by interlocking design. In a preferred embodiment head 14 is manufactured from polycarbonate and formed together with handle 12 and prongs 16. Head 14, however, can according to the present invention be manufactured of any convenient rigid material. These would include wood, metal, or plastic. FIG. 2 also shows a side view of prongs 16 as they are typically affixed to head 14. Prongs 16 will be described in more detail below.

Turning now to FIG. 3 we see an end view of the apparatus for seasoning food 10 particularly describing head 14 and prongs 16. Prong tip 20 is also visible in FIG. 3. According to the present invention a plurality of prongs 16 are mounted to head 14. Prongs 16 can be attached and mounted to head 14 by any convenient and standard mounting methods including adhesives and interlocking designs. Prongs 16 can be manufactured from any rigid, resilient materials, including metals and plastics, and in a preferred embodiment is formed from a polycarbonate material together with head 14 and handle 12. In a preferred embodiment prongs 16 are mounted in a uniform and equally distributed manner over head 14. According to the present invention however, no particular number or distribution of prongs 16 are required.

FIG. 4 is a partial side view of the apparatus for seasoning food 10 taken through section line A—A of FIG. 2. FIG. 4 shows the detail of prongs 16 as described above. It is not intended that prongs 16 should be driven all the way through the food, nor is it the specific purpose of the present invention to tenderize a meat product by cutting through fiber or other hard material.

Prongs 16 need only be long enough to carry the seasonings below the surface of the food and for this purpose it has been determined that a length of one eighth to one half of an inch for prongs 16 is the optimum length. As stated previously, prongs 16 can be fabricated from any rigid material that does not flex or bend when tapped into the food. In the preferred embodiment prongs 16 would be manufactured from a polycarbonate plastic and formed as part of the overall manufacture of apparatus for seasoning food 10. It has been determined, as part of the preferred embodiment of prongs 16, that the outer surfaces of prongs 16 should be slightly roughened in order to better carry the seasonings and flavorings into the body of the food. Additionally, prongs 16 should have a slightly tapered shape for best results as shown in FIG. 4, however, such a taper is not a requirement of the present invention.

Prong tip 20 is also identified in FIG. 4 and is located at the distal end of prongs 16. Prong tip 20 should be sharp enough to make penetration of the food relatively easy however, prong tip 20 should not be so sharp as to cause possible injury to the user of apparatus for seasoning food 10. In a preferred embodiment prong tip 20 would be very slightly rounded, but not so rounded as to cause seasonings or flavorings to adhere thereto.

Turning now to FIG. 5 there is also presented a partial side view of the apparatus for seasoning food 10 taken through line A—A of FIG. 2 and presenting a second embodiment of prongs 16. Prongs 16 in this second embodiment is comprised of prong tip 20 and prong ridges 18. The size, shape, materials and mounting methods for prong 16 in this second embodiment is the same as those described above in the first embodiment, except to the extent that they are modified by prong ridges 18. In this second embodiment, each of the prongs 16 has at least one prong ridge 18. In a preferred embodiment there would be two such prong ridges 18 on each of the prongs 16. The prong ridges 18 divide prongs 16 into at least two separate sections with an abrupt change in the diameter of prongs 16 at the point of the prong ridges 18. The prong ridges 18 facilitate the carrying of additional seasonings and flavorings into the food. Prong ridges 18 should not be so large as to make the penetration of the food more difficult. In a preferred embodiment the prong ridges 18 would be approximately one thirty-second of an inch, such that the change in diameter of prongs 16 at the point of a prong ridges 18 would total approximately one sixteenth of an inch.

It is to be understood that the present invention is by no means limited to the particular constructions herein disclosed, and shown in the drawings, but also comprises any modifications or equivalents within the scope of the claims.

What is claimed is:

1. An apparatus for depositing into the interior of meat a seasoning that has been deposited on the outer surfaces of the meat, the apparatus comprising:
   a rigid handle;
   a rigid head attached to the handle;
   a plurality of rigid, {roughened } prongs engaging the head for depositing the seasoning into the meat when forced downwardly into the meat;

at least one prong ridge on each of such prongs marking an abrupt change in the size of said prongs;

a sharpened prong tip at the distal end of each of such prongs.

2. An apparatus according to claim 1 wherein said rigid handle is manufactured from a metal.

3. An apparatus according to claim 1 wherein said rigid handle is manufactured from polycarbonate.

4. An apparatus according to claim 1 wherein said rigid handle fits conveniently in the hand.

5. An apparatus according to claim 1 wherein said rigid head is manufactured from a metal.

6. An apparatus according to claim 1 wherein said rigid head is manufactured from polycarbonate.

7. An apparatus according to claim 1 wherein said prongs are manufactured from a metal.

8. An apparatus according to claim 1 wherein said prongs are manufactured from polycarbonate.

9. An apparatus according to claim 1 wherein said prongs are approximately one eighth to one half of an inch in length.

10. An apparatus according to claim 1 wherein said prongs are slightly tapered.

11. An apparatus according to claim 1 wherein said prong tips are slightly rounded.

12. An apparatus according to claim 1 wherein said prong ridge is approximately one thirty second of an inch in size.

* * * * *